Jan. 30, 1968 J. A. BENEDICT 3,366,005
PORTABLE DUAL DISPLAY PLANE PROJECTOR APPARATUS
Filed June 1, 1965 2 Sheets-Sheet 1

JOEL A. BENEDICT
*INVENTOR.*

BY

ATTORNEYS

Jan. 30, 1968   J. A. BENEDICT   3,366,005
PORTABLE DUAL DISPLAY PLANE PROJECTOR APPARATUS
Filed June 1, 1965   2 Sheets-Sheet 2
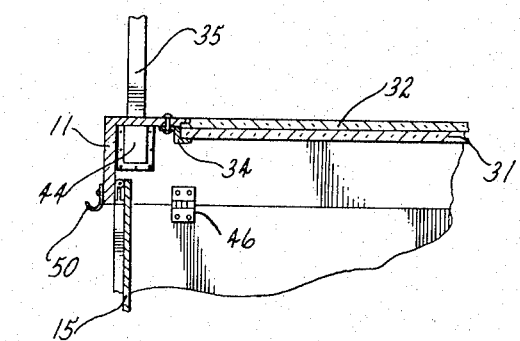
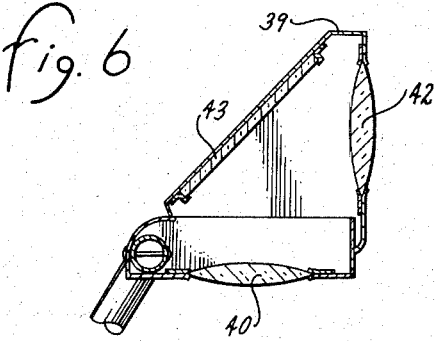
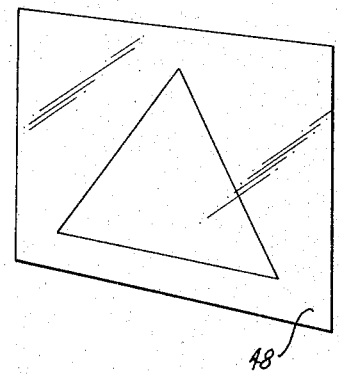
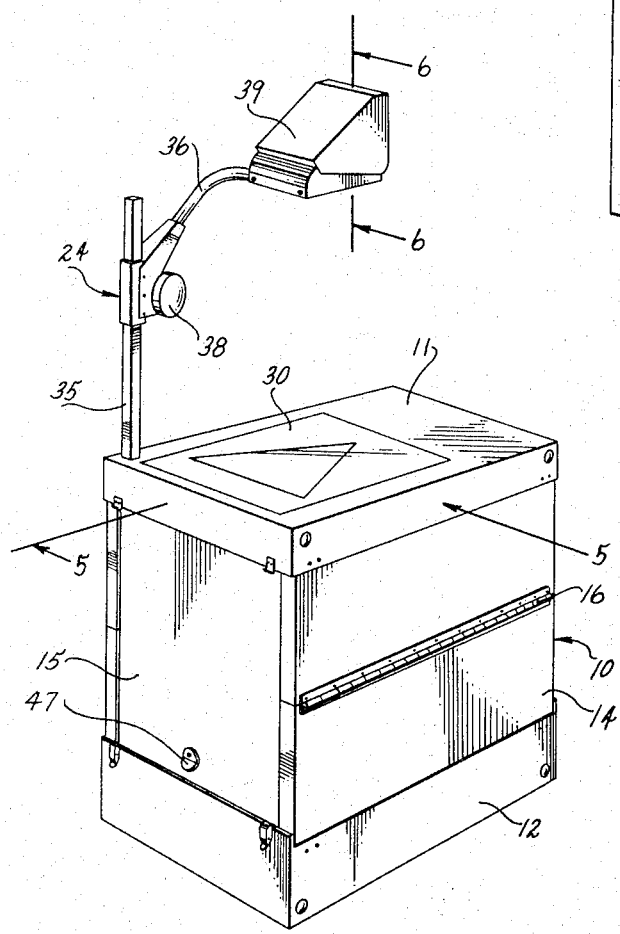
JOEL A. BENEDICT
INVENTOR.
BY
*McLaughlin, Cahill & Drummond*
ATTORNEYS

United States Patent Office 3,366,005
Patented Jan. 30, 1968

3,366,005
PORTABLE DUAL DISPLAY PLANE PROJECTOR APPARATUS
Joel A. Benedict, Tempe, Ariz., assignor to Visual Impact Materials, Inc., Tempe, Ariz., a corporation of Arizona
Filed June 1, 1965, Ser. No. 459,993
1 Claim. (Cl. 88—24)

ABSTRACT OF THE DISCLOSURE

A projector apparatus incorporating dual projection means for simultaneously projecting a slide transparency and an overlay provided in the optical path on a vertical screen. The transparency is directed upon a Fresnel-type lens where an overlay is placed to provide a composite or dual image for subsequent projection through an overhead lens system to the screen.

---

This invention relates to a portable, self-contained dual display plane projector apparatus and more particularly to a dual display plane projector apparatus which is collapsible for transportation and storage.

The use of visual aids for teaching, demonstrations, sales presentations, or the like has become extremely popular in the last few years. A common type of projector for use as a visual aid is the slide projector by means of which transparencies are projected on a screen or other substantially vertical image-receiving display surface. While these slide projectors are highly useful, they are somewhat inflexible in their utility because the addition of material to the slide for demonstration or instruction cannot ordinarily be accomplished while the slide is being projected. Furthermore, with the commonly known slide projectors, it is difficult for a single individual to both project the slides and point out various features appearing on the projected image. Some slide projectors have built-in pointers or the like for this purpose, but the use of these projectors is restricted since an instructor or demonstrator can not pencil in material to be viewed.

Other image projecting apparatus previously available employed large transparencies, such as 8½x11 inch transparent sheets which were projected indirectly and on which an instructor, demonstrator or the like could write in notes or additional features while projecting the images. These have proved largely undesirable because of size and storage considerations, both for the transparencies and the apparatus.

Attempts to combine the advantages inherent in the small transparent slide projectors and the large transparency-type indirect projectors have met with but limited success. Apparatus of the prior art which attempted to combine the advantages of these projection techniques are ordinarily very expensive as well as bulky and hard to transport. Even apparatus nominally designated as portable are portable in name only since they are heavy and bulky.

It is therefore a principal object of my invention to provide a portable projector apparatus which is inexpensive and light-weight.

It is another object of my invention to provide a projector apparatus which is operable by a single individual who may concurrently explain and point out various features on the projected image.

It is still another object of my invention to provide a projector which is entirely self-contained except for a source of electrical power.

It is a further object of my invention to provide a projector apparatus which is collapsible for storage or transportation.

It is a still further object of my invention to provide a projector apparatus which will simultaneously project and display an image on a substantially vertical plane and a substantially horizontal plane.

Other objects and advantages of my invention will become apparent in the course of the following specification and claims when taken in view of the accompanying drawings.

Briefly, my projector apparatus comprises a substantially rectangular, box-like body having a projector means disposed therein. The projector is complete in that it includes a light source, an optical condenser system and a transparency holder. An electric cord for communication with a source of electricity is stowable in the body member. Image redirecting means directs the projected image from the optical system of the projector means to a Fresnel-type lens which is supported substantially horizontally by the top of the body member. The Fresnel-type lens is adapted to receive and display the image from the image redirecting means.

The projected image, displayed by the Fresnel-type lens, is visible to the operator of the projection apparatus and, if desired, may have a transparent overlay to receive written or diagrammatic subject matter. The projected image displayed by the Fresnel-type lens, and any additional subject matter added thereto at the horizontal display plane, is received and redirected by a projection assembly positioned above the Fresnel-type lens. The image is redirected for display on a substantially vertical image receiving and display surface, such as a screen, wall, or the like.

The body of my projector apparatus has top and bottom members which are joined by folding side members. In use, the side members are in an unfolded, substantially vertical position and support the top carrying the Fresnel lens at a correct distance above the image redirecting means associated with the projector means. The bottom member of the body is adapted to contain and store the projection assembly for transportation or the like. To collapse the body for storage or transportation, the side members are folded inwardly so that the top portion of the body is lowered into lockable proximity with the bottom portion. Suitable clasping or locking means maintain the body in a folded, closed condition with all the operative elements of the combination enclosed therein.

A better understanding of my invention may be obtained in view of the accompanying drawings in which:

FIGURE 4 is an isometric front quarter view of my portable projector apparatus substantially as it would appear in an assembled condition ready for use;

FIGURE 5 is a partial sectional view taken along 5—5 of FIGURE 4 illustrating a method of operably securing the projection assembly in the top body member; and FIGURE 6 is a sectional view taken along 6—6 of FIGURE 4 illustrating a preferred lens and reflector projection assembly to receive and redirect projected image.

Figure 3:
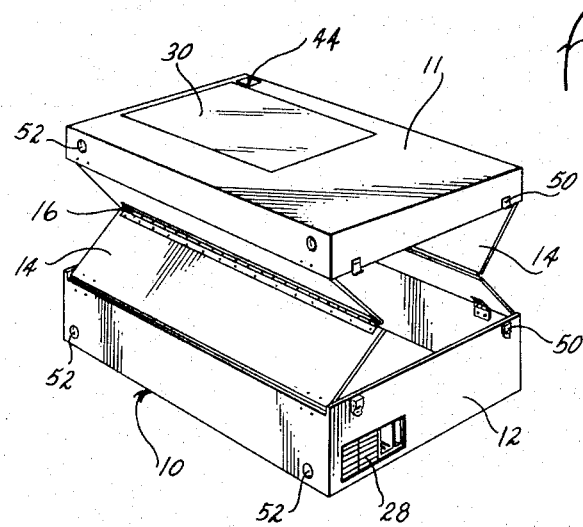
FIGURE 3 is an isometric view illustrating the collapsible features of my invention.
Figure 2:
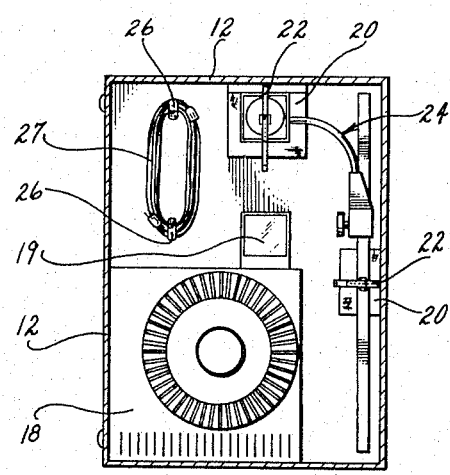
FIGURE 2 is a sectional view taken along 2—2 of FIGURE 1 illustrating the positions of various elements within the lower body member.

With reference to the drawings, a body generally designated by the reference character 10 comprises a top portion 11, bottom portion 12, side panels 14, and a front panel 15. The side panels 14 each comprise an upper and lower panel member foldably joined by a horizontal hinge 16. The upper and lower side panel members are foldably joined to the top and bottom body members 11 and 12, respectively. The front panel 15 is foldingly secured to the top body member 11. Projecting means 18 is mounted in the bottom portion and includes a light source, an optical condenser system, and a transparency holder. Preferably, the projecting means 18 is a standard 35 millimeter (mm.) slide projector adapted by cartridge or other appropriate means to store and hold a plurality of slides or transparencies. The projecting means illustrated in FIGURE 2 is a well-known, readily available slide projector employing a rotary, top-mounted cartridge containing standard slide-type transparencies. Image redirecting means 19 in the form of a prism is secured in front of the image projecting output of the slide projector 18. The prism may be secured directly to the slide projector 18 or may be secured to the bottom body member in the desired position. In the embodiment shown, an image is projected substantially horizontally by the slide projector 18 and is redirected to have an axis of projection which is substantially vertical.

Pads 20 and clamp members 22 are secured to the bottom body member 12 to restrain and secure a projection assembly 24 for storage or transportation. If desired, clips 26 may be provided in the bottom member 12 for storage of an electric cord 27 used to supply electric power to slide projector 18. Ventilating aperture 28 is provided in the bottom member 12 for cooling the electric light source in the slide projector 18. If desired, the ventilating aperture 28 may be used as an access port to make electrical connection between the slide projector 18 and a source of electric power.

A window 30 is provided in the top member 11 of the body and comprises a Fresnel-type lens 31 with a transparent protective member 32 positioned thereabove. I prefer to have the transparent protective member 32 fabricated of a material on which I may write or draw to add material to the image being projected. I also prefer that the protective member is of a material which is easily cleaned so that new material may be added to subsequently projected images. A keeper flange 34 is riveted to the underside of the top member 11 and forms a channel therewith. The Fresnel-type lens 31 and transparent protective member 32 engage in the channel and are secured thereby.

Projection assembly 24 comprises a substantially vertical support rod 35 having an arm member 36 movably secured thereto. Adjustment of the height of the arm member 36 is accomplished by a hand knob 38 having a nylon-covered friction roller secured thereto and actuated thereby. The nylon-covered roller frictionally engages the support rod 35 so that a rotary motion of the knob 38 causes the arm member 36 to move up or down as desired. A housing 39 is secured to the outer end of the arm member 36 and is positioned over the window 30 in the top member 11 of the body 10. A pair of lenses 40 and 42 and a mirror 43 are mounted in the housing 39 to receive and redirect projected images which are displayed at the window 30 to a substantially vertical image receiving and display surface. Lens 40 is substantially horizontal and directs the image vertically to the mirror 43 which reflectively redirects the image horizontally through substantially vertical lens 42. A socket 44 is provided in the top member 11 of the body 10 to accept and hold the vertical support rod 35 in its operative position.

Front panel 15 is secured to the top member 11 by hinges 46 whereby said front panel is foldable upwardly and inwardly into the body 10 for collapsing the apparatus for storage or transportation. A pull tab 47 is employed to assist in positioning the front panel when the apparatus is being set up. The front panel 15 is operatively positioned between the side panel members 14 and braces them to prevent their buckling or folding inwardly when the projector apparatus is being used.

As particularly illustrated in FIGURE 4, an image projected by the projecting means 18 is displayed substantially at the plane of the window 30 and is visible to the operator of the apparatus. The image appearing at the window is received by the lens and mirror combination supported by the housing 39 and projected thereby onto a vertical screen 48 or other image receiving and display surface. Thus, the image projected by the projecting means 18 is visible on two planes. If desired, the operator may point out various features on the projected image at the plane of the window 30 employing a pointer or other indicating means. The pointer or other indicating means will appear on the image projected on the screen and be visible to an audience. Similarly, the operator may add writing, sketches or the like to the image at the plane of the window 30 and have the additional material appear as a part of the image displayed on the vertical screen. Thus, the operator can project an image on the screen and then, without leaving his station, point out various features in or add material to the displayed image.

Figure 1:
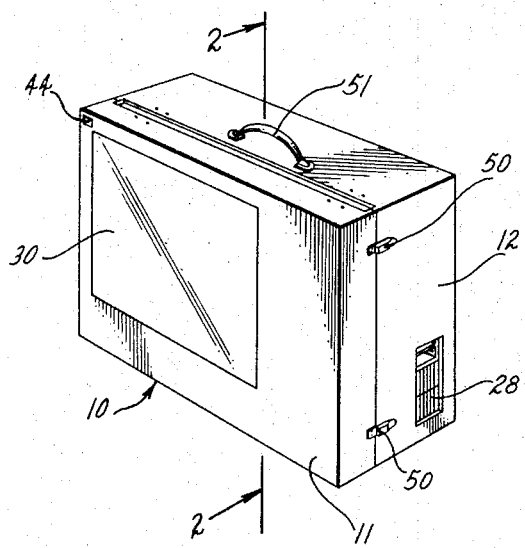
FIGURE 1 is an isometric view of my portable projector apparatus in a folded, closed condition for storage or transportation.

To prepare the apparatus for storage or transportation, the operator simply removes the projection assembly 24 from the socket 44 and stores it in the bottom member 12 as illustrated in FIGURE 2. The electric cord is wound on the clips 26 and neatly stored thereby. Front panel 15 is pushed inwardly and upwardly until it is above the hinge 16 which substantially horizontally bisects the side panels 14. Side panels 14 are then folded inwardly, thus lowering the top member 11 into lockable proximity with the bottom member 12. Clasp or locking members 50 secure the top and bottom members 11 and 12 in collapsed assembly with front and side panels 15 and 14 inside. A handle 51 may be provided for ease in carrying although it is not an absolute requirement. Protective feet 52 are positioned on the bottom of the projector apparatus to support and protect the bottom from abrasion with a surface on which the apparatus rests in use. Protective feet 52 are also positioned on the side walls of the top and bottom members 11 and 12 opposite the handle 51 to protect the side walls when the apparatus is positioned as in FIGURE 1 for carrying.

As a further modification, I desirably provide means for covering the Fresnel-type lens and is transparent protector while the apparatus is being stored or transported. The cover may be a flexible material or of a substantially rigid material as desired. Securing of the cover may be accomplished by clips, snaps, or any other suitable means.

Various modifications may be made in my invention without deparing from the spirit or scope thereof, and it is to be understood that I limit myself only as defined in the appended claim.

I claim:
1. A portable, self-contained dual display plane projector apparatus comprising
  (a) a collapsible body in the form of a substantially rectangular box, said body comprising
    (1) a top member in the form of an open inverted box,
    (2) a bottom member in the form of an open topped box,
    (3) substantially flat side members foldably joined to said top and bottom members, each said side member comprising an upper and a lower panel member foldably joined by a substantially horizontal hinge member, and
    (4) a substantially flat front member foldably joined to said top member,
    (5) whereby said top and bottom members may be collapsed into locking proximity with said front and side members folded inside,
  (b) projecting means comprising a 35 millimeter slide projector disposed in said bottom member of said body for projecting an image from a slide transparency, said projector including
(1) an electric light source,
(2) an optical condenser system, and
(3) a slide transparency holder,
(c) an image redirecting means secured in substantial alignment with the axis of projection of said projector for re-directing an image projected thereby,
(d) a substantially horizontal Fresnel-type lens mounted in the top member of said body and adapted to receive and display a projected image from said redirecting means,
(e) a transparent lens protector mounted in the top member of said body above said Fresnel-type lens,
(f) a projection assembly comprising
(1) a substantially vertical support rod having an arm member movably secured thereto,
(2) a housing secured to the outer end of said arm member,
(3) said housing supporting a horizontal and a vertical lens in co-operation with a mirror,
(g) a socket in said top member for receiving and supporting said support rod and projection assembly with said housing positioned above said Fresnel-type lens to receive and redirect a projected image for display on a substantially vertical surface,
(h) said projection assembly stowable in said bottom member when said body is collapsed,
(i) pad and clamp means mounted in said bottom portion for securing said projection assembly therein, and
(j) locking means adapted to engage between said top and bottom members when said body is in a collapsed condition,
(k) whereby said image is simultaneously displayed on substantially horizontal and substantially vertical planes and said apparatus is conveniently collapsed for portability and storage.

References Cited
UNITED STATES PATENTS

| | | | |
|---|---|---|---|
| 2,496,647 | 2/1950 | Woodbury | 88—24 X |
| 2,634,652 | 4/1953 | Barth | 88—24 |
| 2,767,611 | 10/1956 | Fitzgerald | 88—24 X |
| 2,863,356 | 12/1958 | Goldberg | 88—24 X |
| 3,285,126 | 11/1966 | Lucas | 88—24 X |
| 3,209,646 | 10/1965 | Appeldorn et al. | 88—24 |
| 3,276,314 | 10/1966 | Robinson | 88—24 |

FOREIGN PATENTS 1,323,168  2/1963  France.

NORTON ANSHER, *Primary Examiner.*

R. M. SHEER, *Assistant Examiner.*